(No Model.)
J. W. BROOKER.
CAR COUPLING.
No. 421,232. Patented Feb. 11, 1890.
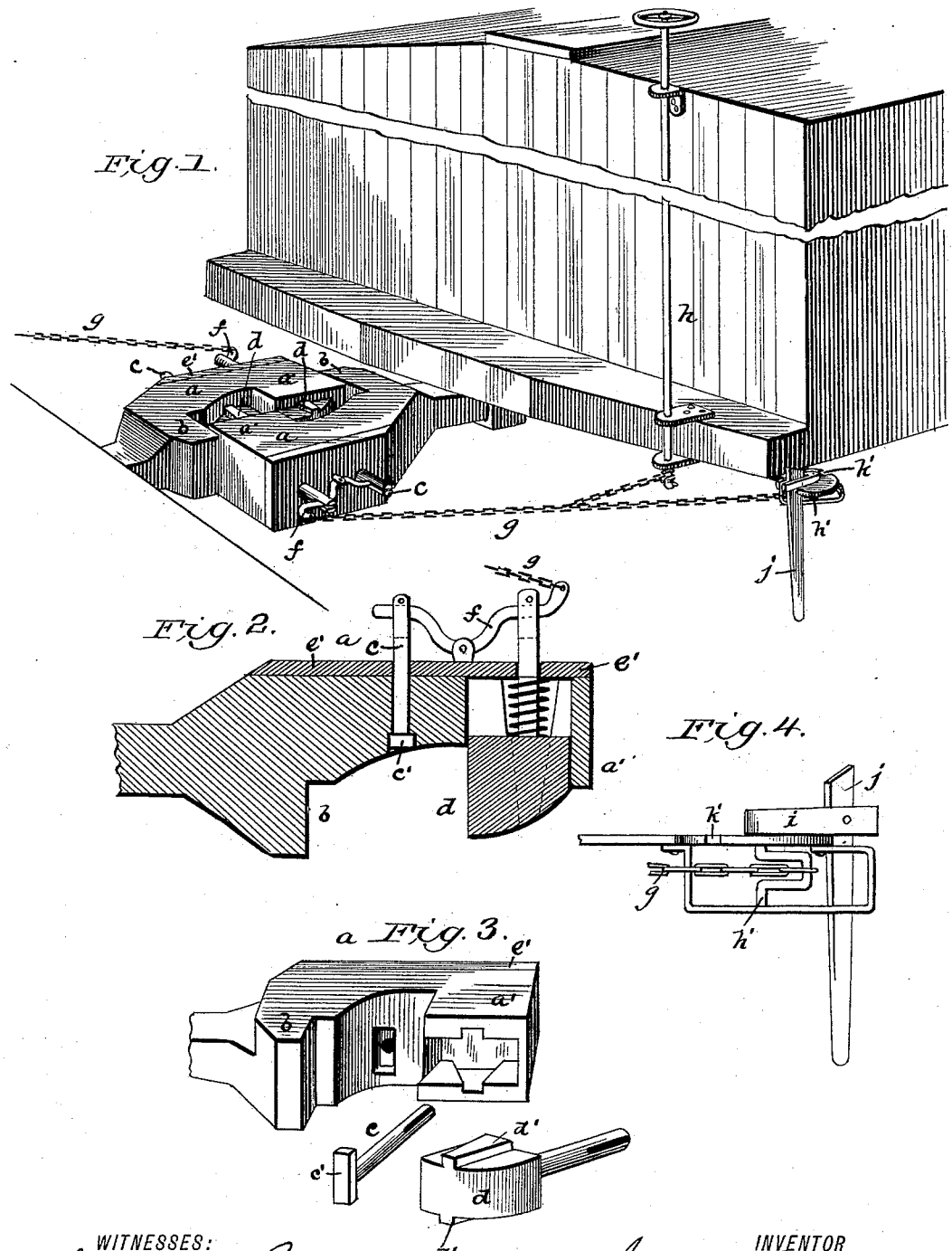
WITNESSES:
Joseph A. Ryan
INVENTOR
John W. Brooker
BY C. M. Alexander
ATTORNEY.

UNITED STATES PATENT OFFICE.

JOHN W. BROOKER, OF DALTON, GEORGIA.

CAR-COUPLING.

SPECIFICATION forming part of Letters Patent No. 421,232, dated February 11, 1890.

Application filed December 12, 1889. Serial No. 333,427. (No model.)

*To all whom it may concern:*

Be it known that I, JOHN W. BROOKER, a citizen of the United States, residing at Dalton, in the county of Whitfield and State of Georgia, have invented certain new and useful Improvements in Car-Couplings, of which the following is a specification, reference being had therein to the accompanying drawings, in which—

Figure 1 represents a perspective view of a pair of couplings coupled; Fig. 2, a horizontal sectional view of one of the draw-heads; Fig. 3, a perspective view of one of the draw-heads, the sliding dogs and their securing-plate removed; Fig. 4, a detail view of one of the operating devices.

Referring to the annexed drawings by letter, $a$ designates the draw-heads, which may be attached to the car-beams by means of the draw-bars of ordinary construction. The draw-heads each have formed upon their forward ends lateral hook-like portions $a'$, and near their rear ends shoulders $b$. Working in horizontal transverse passages formed through each of the draw-heads back of the hooks $a'$ are sliding rods $c$, provided with heads $c'$, which fit normally in corresponding recesses in the faces of the draw-heads, the rear ends of these rods projecting out through an aperture in a plate $e'$ secured on the back of the draw-head, as shown. Working in a recess in the hook portion of each of the draw-heads is a sliding spring-actuated dog $d$, the forward end of which projects normally out a short distance from the face of the hook $a'$, and is beveled or rounded off on its front side. The reduced rear end of each of these dogs passes out through an aperture in the plate $e'$ secured on the back of the draw-head. Upon the upper and lower faces of each of these sliding dogs are formed tapering ribs $d'$ $d'$, which fit and work in similarly-shaped grooves in the walls of the recess or passage in which the dog works, these ribs serving to limit the forward movement of the sliding dogs and prevent undue lateral vibrations during the act of coupling.

The projecting ends of each pair of the dogs and sliding rods $c$ are pivotally connected together by means of a lever $f$ pivoted between them upon the back of the draw-head. Operating-chains $g$ are connected to the forward ends of the levers $f$. These chains are operated either from the top of the car by means of a vertical shaft $h$, provided with a hand-wheel at its upper end, or from the side of the car by a short vertical crank-shaft $h'$, journaled in suitable bearings on the end beams of the car.

The device for operating the coupling devices from the side of the car is shown in detail in Fig. 5 of the drawings. The extended upper end of the crank-shaft is provided with a lateral arm $i$, between the forked end of which is pivoted a gravitating operating-lever $j$, adapted to drop into either one of two notches $k'$ in a disk $k$ bolted to the car-beam, as will presently appear. This lever $j$ normally rests in the notch $k$ nearest the draw-bar.

The operation of the device is as follows: The draw-heads are so arranged that when the cars come together they will pass alongside of each other, their forward ends abutting against their respective shoulders $b$. The sliding dogs will be automatically pressed and held back in their respective recesses until the hooks $a'$ pass each other, when they will automatically spring out again and catch or pass behind the said hooks $a'$, when the draw-heads will be securely coupled. To uncouple the draw-heads, it is simply necessary to draw upon either one of the chains $g$, whereupon the forward end of one pivoted lever $f$ will draw the attached sliding dog back in its recess and the opposite dog will be forced back in its recess by the forward movement of rod $c$, leaving the draw-heads free to be separated.

In case it is desired to keep the dogs pressed back in their recesses, this may be done by dropping the lever $j$ into the notch $k'$ farthest from the draw-head. In this way the forward end of the lever $f$ may be held away from the draw-head, the attached sliding dog being held back in its recess, and the sliding rod kept pressed forward a sufficient distance to hold its opposite dog back in its recess. The cars may be then drawn apart at any time, no further attention of the operator being required.

Having thus fully described my invention, what I claim, and desire to secure by Letters Patent, is—

1. The combination, with a draw-head, of a spring-actuated dog in the draw-head, a sliding rod passing through the draw-head back of said dog, and a lever for simultaneously operating the said dog and rod in opposite directions, substantially as and for the purpose described.

2. The combination, with the draw-head provided with a sliding dog and rod, and a lever for operating these parts, of a crank-shaft connected to said lever by a chain, an operating-lever secured to said crank-shaft, and a disk provided with stop-notches for the reception of said operating-lever, substantially as and for the purpose described.

3. The combination, with a draw-head provided with a hook, of a sliding dog provided with a beveled projecting nose, this dog being also provided with wedge-shaped ribs which fit in corresponding grooves in the draw-head, a sliding rod passing through the draw-head in the rear of said dog, and an operating-lever pivotally connected to the said rod and dog and pivoted between them, as and for the purpose described.

In testimony whereof I affix my signature in presence of two witnesses.

JOHN W. BROOKER.

Witnesses:
J. C. NORTON,
D. SHOLL.